(12) United States Patent
Kodama et al.

(10) Patent No.: US 8,491,362 B2
(45) Date of Patent: Jul. 23, 2013

(54) METHOD AND DEVICE FOR DEBONING BONE-IN LEG

(75) Inventors: Ryuji Kodama, Tokyo (JP); Toshikazu Kamae, Tokyo (JP); Koji Kido, Tokyo (JP)

(73) Assignee: Mayekawa Mfg. Co., Ltd (JP)

( * ) Notice: Subject to any disclaimer, the term of this patent is extended or adjusted under 35 U.S.C. 154(b) by 0 days.

(21) Appl. No.: 13/446,011

(22) Filed: Apr. 13, 2012

(65) Prior Publication Data

US 2012/0231715 A1 Sep. 13, 2012

Related U.S. Application Data

(63) Continuation of application No. PCT/JP2011/001380, filed on Mar. 9, 2011.

(30) Foreign Application Priority Data

Mar. 30, 2010 (JP) ................................. 2010-079351

(51) Int. Cl.
*A22C 17/00* (2006.01)
(52) U.S. Cl.
USPC ........................................................ 452/136
(58) Field of Classification Search
USPC ................. 452/135, 136, 149–153, 156, 157, 452/166, 167
See application file for complete search history.

(56) References Cited

U.S. PATENT DOCUMENTS

| | | | | |
|---|---|---|---|---|
| 5,203,736 A * | 4/1993 | Schulte et al. | ................ | 452/135 |
| 5,401,210 A | 3/1995 | Manmoto et al. | | |
| 5,462,477 A * | 10/1995 | Ketels | ........................... | 452/135 |
| 5,782,685 A * | 7/1998 | Hazenbroek et al. | ......... | 452/138 |
| 5,810,653 A * | 9/1998 | Van Craaikamp et al. | ... | 452/136 |
| 5,976,004 A * | 11/1999 | Hazenbroek | ................... | 452/136 |
| 6,007,417 A * | 12/1999 | Jones et al. | ................... | 452/138 |
| 6,059,648 A | 5/2000 | Kodama et al. | | |
| 6,106,384 A * | 8/2000 | Mutoh et al. | .................. | 452/135 |
| 6,299,524 B1 * | 10/2001 | Janssen et al. | ............... | 452/198 |
| 7,198,564 B2 * | 4/2007 | Hino et al. | .................... | 452/135 |
| 8,277,294 B2 * | 10/2012 | Van Hillo et al. | ............. | 452/148 |

FOREIGN PATENT DOCUMENTS

JP 2001-149001 A 6/2001
JP 2002-010732 A 1/2002

OTHER PUBLICATIONS

ISR issued Jun. 14, 2011 for international parent application PCT/JP2011/001380.

* cited by examiner

*Primary Examiner* — Richard Price, Jr.
(74) *Attorney, Agent, or Firm* — Rossi, Kimms & McDowell LLP (57) ABSTRACT

In an automated deboning device for deboning a bone-in leg of livestock carcass, a clamp unit 12 suspending the work w includes a servomotor 104, a threaded shaft 106 connected to an output shaft of the servomotor 104 and a lifting and lowering block 108 threadably mounted on the threaded shaft 106. A lifting and lowering roller 92 mounted on a lifting and lowering shaft 70 travels in a traveling path 94 to lower and transfer the work w to a next work station. By bring a swinging roller 84 mounted on the lifting and lowering shaft 70 in contact with the cam plate 170, 180, 182, the lifting and lowering shaft 70 is rotated by a setting angle so that the work w faces round cutter blades 22, 64. Thus, the pathway of the round cutter blades 22, 64 can be approximately straight, thereby simplifying and reducing the cost of the moving mechanism.

12 Claims, 9 Drawing Sheets

METHOD AND DEVICE FOR DEBONING BONE-IN LEG

This is a continuation of and claims priority to International Application No. PCT/JP2011/001380 filed Mar. 9, 2011, which in turn claims priority to JP2010-079351 filed Mar. 30, 2010, the contents of which are incorporated herein by reference.

TECHNICAL FIELD

The present invention relates to a method and a device for deboning bone-in leg of a livestock carcass, e.g. bone-in leg of a poultry carcass, in which the process from an incision-making to a meat-separating is automated.

BACKGROUND ART

In recent years, farming and slaughtering of birds and animals is conducted on a large scale in response to an increasing demand thereof. Thus, it is desired to fully automate each step of the process.

Slaughtering of a poultry carcass of livestock carcasses, can be divided into two main steps. One is a first slaughtering step in which killing to exsanguination, de-feathering and cleaning of the carcass is performed. The other is a second slaughtering step in which, after cooling the carcass having been processed in the first slaughtering step, the carcass is divided and deboned per each section thereof so as to produce carcass meat and by-products which are then packaged and stored.

In the first slaughtering step, killing to exsanguination, de-feathering and cleaning of the carcass is automated and requires almost no manual labor between the steps. In the second slaughtering step, separating of upper and lower portions of the carcass, separating of each portion such as leg meat and breast meat and deboning of the separated portions are increasingly automated. By this, the slaughtering processing is increasingly automated and thus the yield rate is improving in the same manner as the manual case.

Patent Document 1 proposes to automate an incision-making step which is needed as a preceding step prior to a deboning step by a deboning unit. As disclosed in Patent Document 1, many pieces of bone-in leg are suspended from a clamp unit and transferred to an incision-making station, and stopped at the incision making station so as to make an incision on the meat in a state that the bone-in leg is immobilized. At the incision-making station, the bone-in leg is precisely positioned and secured so that an incision knife can be moved precisely along a surface of the bones. This achieves a higher yield rate.

Patent Document 2 discloses an automated meat-separating means for separating bone-in leg of livestock animals such as a chicken. This means hangs the ankle of the bone-in leg from a clamp unit and transfers the bone-in leg. The means stops at a plurality of work stations and advances intermittently between the work stations. As shown in FIG. 9 of Patent Document 2, a moving path of the clamp unit is formed in a circle. The number of work stations are arranged along this circular moving path to conduct the incision-making step and the meat-separating step in which tendon is cut and the meat is removed.

The tendon is cut with use by means of a round cutter blade which is located in a vicinity of the transferring path of the leg meat and toward a traversing direction of the bone. The round cutter blade is moved closer to the bone-in leg so as to cut the tendon from the bone. As shown in FIG. 10 of Patent Document 2, in the meat-separation step, the leg meat is held at a bone part by a pair of separators (pressing plates), and the leg meat is removed from the bone by lifting the clamp unit. By detecting the position of the femur end, a precise position at which the removing of the leg meat ends can be determined. The muscle of the femur end is cut so that the leg meat can be completely separated from a femur head.

CITATION LIST
Patent Literature
PTL 1
JP2001-149001A
PTL 2
JP2002/010732A

SUMMARY OF INVENTION

Technical Problem

In the incision making device disclosed in Patent Document 1, the incision is made by moving an incision knife unit including the incision knife and the drive unit in the vertical direction. Thus, it requires a great amount of power to move the heavy incision knife unit and the moving mechanism for the incision knife unit inevitably becomes large. In the case of using an air cylinder as the drive unit for the incision knife unit, the pressure of the compressed air must be substantially high to lift the incision knife unit to a prescribed height with high precision.

According to Patent Document 1, the incision knife is moved along the inner curved surface of the bones of the bone-in leg by moving the incision knife from the ankle down to the end of the femur. However, with such simple movement, the incision knife cannot reach the tendon firmly attached to the knee joint and thus it is difficult to smoothly separate the meat part from the bones. As a result, the yield rate is not improved.

Further, according to Patent Document 1, the incision making device is arranged in the vicinity of the deboning device body. The incision making device is large, taking up a lot of space. As a result, the overall size of the deboning device becomes large as well.

In the automated meat-separating means disclosed in Patent Document 2, the incision-making step is not specifically described. It is assumed that the incision-making step is manually performed by an operator.

In the meat-separating step, in order to cut the tendon attached to the bones, the round cutter blades are moved along a complicated arc pathway on two-dimensional flat surface to reach the tendious attachment in order to cut the tendon attached to the bones. Thus, a control mechanism for moving the round cutter blades inevitably becomes expensive.

In view of the problems above, a first object of the present invention is to achieve cost reduction by simplifying a mechanism of transferring the bone-in leg and reducing the required power in an automated deboning process of the bone-in leg such as livestock carcass.

It is a second object of the present invention is to simplify and reduce the price of a moving mechanism of the cutter blades in the process of moving the cutter blades to the bone-in leg to cut the bone-in leg.

It is a third object of the present invention is to improve a meat yield in an automated incision-making step, by firmly cutting the tendon attached to the knee joint.

Solution to Problem

To achieve the objects, an aspect of the present invention is a method for deboning a bone-in leg by means of a deboning device. The method may include, but is not limited to, the steps of: clamping the bone-in leg at an ankle thereof by a clamp unit; transferring the clamp unit intermittently between a plurality of work stations; and performing in each of the working station at least one of an incision-making process of making an incision on the bone-in leg longitudinally by moving a cutter blade along the bones and a meat-separating process of separating a meat part of the bone-in leg from the bones by lifting the bone-in leg relatively upward while holding down the meat part from above by means of a meat separator and cutting a tendon with a cutter blade. The deboning device may include: a lifting and lowering shaft whose lower end is attached to the clamp unit and which has a lifting and lowering roller above the clamp unit; an elevating unit which is provided in each of the work stations and includes a drive motor, a threaded shaft connected to an output shaft of the drive motor and a lifting and lowering table threadably mounted on the threaded shaft; and a traveling path which is arranged between the work stations and slopes downward in a transferring direction of the clamp unit. The incision-making process or the meat-separating process can be performed at one of the working stations by placing the lifting and lowering roller on the lifting and lowering table and lifting the bone-in leg by lifting the lifting and lowering table. The lifting and lowering roller can travel in the traveling path under weight of the bone-in leg to transfer the clamp unit downward from one work station to a subsequent work station.

According to the deboning method, the incision-making step and the meat-separating step is performed by lifting the clamp unit at the work station by means of the elevating unit. With use of the self-weight of the bone-in leg, the lifting and lowering roller mounted on the lifting and lowering shaft travels along the traveling path such that the clamp unit is lowered while being transferred to the subsequent work station.

By this, it is possible to simplify the structures of the lifting unit and the transferring mechanism for transferring the bone-in leg between the work stations. It is also possible to achieve cost reduction by reducing the required power of the drive motor.

By using the servomotor as the drive motor, the height of the clamp unit can be precisely controlled.

In the deboning method, the deboning device may also include a turning mechanism which is provided in at least one of the work stations having the cutter blade and turns the lifting and lowering shaft by a setting angle. The lifting and lowering shaft is turnable around a shaft center thereof. The turning mechanism turns the lifting and lowering shaft so that a part to be cut of the bone-in leg faces the cutter blade. The cutter blade is moved toward the part to be cut of the bone-in leg along a linear pathway to cut the part to be cut of the bone-in leg.

By turning the lifting and lowering shaft so that the part to be cut faces the cutter blade, the cutter blade can be moved toward the part to be cut along the linear pathway. As a result, the pathway of the cutter blade is simplified and thus, the moving mechanism of the cutter blade can be simplified and cheaper.

In the deboning method, the cutter blade may be a tendon cutter blade constituted of a round blade which is arranged in a horizontal direction. The tendon cutter blade is moved in the linear pathway toward the part to be cut of the bone-in leg. The tendon cutter blade cuts a tendon that is attached to the bones.

In the deboning method, at least one of the work stations is an incision-making station at which the incision-making process is performed. The incision-making process may include, but is not limited to: an ossa-cruris incision step of making an incision from around the ankle to an upper part of the knee joint by lifting the bone-in leg relatively upward with respect to the cutter blade while moving the cutter blade along an inner curved surface of the bones; a knee-joint incision step of making an incision on the tendon by turning the lifting and lowering shaft temporarily so that the cutter blade is moved around a tendious attachment of the knee joint from the inner curved surface of the bones and then reversing the clamp unit to return the inner curved surface of the bones to face the cutter blade; and a femur incision step of making an incision from a lower part of the knee joint to an end of the femur by lifting the bone-in leg relatively upward with respect to the cutter blade while moving the cutter blade along the inner curved surface of the bones.

As described above, when the cutter blade reaches the knee joint while the bone-in leg is lifted, the clamp unit is turned by the setting angle so that the cutter blade is moved around the tendious attachment of the knee joint from the inner curved surface of the bones to cut the tendon. Thus, the tendon firmly attached to the knee joint can be firmly separated. As a result, the following meat separating step can be smoothly performed, and thus the meat yield is improved.

The clamp unit alone is lifted without moving the unit with the incision knife. Thus, the lift unit for moving the heavy incision knife unit upward can be removed. According to the deboning method of the aspect of the present invention, the light clamp unit is lifted instead of the heavy incision knife unit. The incision making station can be simplified and made at lower cost and the positioning of the bone-in leg at the setting height can be performed at high precision.

In the incision-making step, a lower end of the bone-in leg is detected while the bone-in leg is lifted and a total length of the bones of the bone-in leg is obtained based on a height at which the detection is performed and a lift amount of the bone-in leg when the lower end of the bone-in leg is detected. A lift amount of the clamp unit in a final meat-separation process with respect to a meat separator holding down the meat part, is set in accordance with the total length of the bone-in meat having been obtained.

Therefore, the bone part and the meat part can be firmly separated in the final meat-separating process by adjusting the lift amount of the clamp unit in accordance with individual differences in the length of the work.

Another aspect of the present invention is a device for deboning a bone-in leg, which can directly used for implementing the method of the first aspect of the present invention. The device may include, but is not limited to: a plurality of work stations at which at least one of an incision-making process of making an incision on the bone-in leg longitudinally by moving a cutter blade along the bones and a meat-separating process of separating a meat part of the bone-in leg from the bones by lifting the bone-in leg relatively upward while holding down the meat part from above by means of a meat separator and cutting a tendon with a cutter blade is performed; a clamp unit which clamps the bone-in leg at an ankle thereof; a transferring mechanism which intermittently transfers the clamp unit from one work station to another; a lifting and lowering shaft whose lower end is attached to the clamp unit and which has a lifting and lowering roller above the clamp unit; an elevating unit which is provided in each of the work stations and comprises a drive motor, a threaded shaft connected to an output shaft of the drive motor and a lifting and lowering table threadably mounted on the threaded shaft; and a traveling path which is arranged between the work stations and slopes downward in a transferring direction of the clamp unit. The incision-making process or the meat-separating process is performed at one of the working stations by placing the lifting and lowering roller on the lifting and lowering table and lifting the bone-in leg by lifting the lifting and lowering table. The lifting and lowering roller travels in the traveling path under weight of the bone-in leg to transfer the clamp unit downward from one work station to a subsequent work station.

As described above, the clamp unit is lifted by means of the elevating unit to perform the incision making step and the meat separating step. With use of the self-weight of the bone-in leg, the lifting and lowering roller mounted on the lifting and lowering shaft travels along the traveling path such that the clamp unit is lowered while being transferred to the subsequent work station.

By this, it is possible to simplify the structures of the lifting unit and the transferring mechanism for transferring the bone-in leg between the work stations. It is also possible to achieve cost reduction by reducing the required power of the drive motor. By using the servomotor as the drive motor, the height of the clamp unit can be precisely controlled.

The deboning device may further include a turning mechanism which is provided in at least one of the work stations having the cutter blade and turns by a setting angle the lifting and lowering shaft which is turnable around a shaft center thereof. The turning mechanism turns the lifting and lowering shaft so that a part to be cut of the bone-in leg faces the cutter blade and the cutter blade is moved toward the part to be cut of the bone-in leg along a linear pathway to cut the part to be cut of the bone-in leg. By turning the lifting and lowering shaft so that the part to be cut faces the cutter blade, the cutter blade can be moved toward the part to be cut along the linear pathway. As a result, the pathway of the cutter blade is simplified and thus, the moving mechanism of the cutter blade can be simplified and cheaper.

In the deboning device, the lifting and lowering shaft may include a guide bar which is fixed to the transferring mechanism, a sliding bracket which slides upward and downward along the guide bar and a rotation shaft which is arranged rotatably within the sliding bracket and whose lower end is attached to the clamp unit. The turning mechanism includes a swinging roller attached to the rotation shaft, a cam member which pushes the swinging roller when the clamp unit is lifted and the cutter blade is moved closer to a knee joint so as to turn the rotation shaft by the setting angle and a spring member which returns the swinging roller to an original position when the clamp unit is further lifted and the swinging roller moves away from the cam member.

The lifting and lowering shaft is configured as described above and the swinging roller attached to the rotation shaft is pushed by the cam member provided at the work station. Thus, the turning mechanism can be configured by machine parts only and there is no need for a separate drive unit or a complicated electronic control unit. As a result, it is possible to reduce the cost of the turning mechanism. Without the electronic control unit, the device is less subject to failure, resulting in improving the reliability thereof.

In the work station at which the meat-separating step is performed, the cutter blade may be a tendon cutter blade constituted of a round blade which is arranged in a horizontal direction. The cutter blade is moved toward the part to be cut of the bone-in leg along a linear pathway to cut the part to be cut of the bone-in leg. The tendon cutter blade cuts a tendon which is attached to the bones. Thus, the moving mechanism of the tendon cutter blade can be simplified and cheaper.

In the deboning device, at least one of the work stations may be an incision-making station which includes the cutter blade capable of moving toward and away from the bone-in leg, an attitude holding plate which is disposed to face a moving direction of the cutter blade and a pressing member which presses a flat side of the bone-in leg against the attitude holding plate. The turning mechanism turns the lifting and lowering shaft by a prescribed angle in the middle of moving upward. The cutter blade is inserted near the ankle of the bone-in leg in such a state that the pressing member presses the bone-in leg against the attitude holding plate and the clamp unit is lifted such that the cutter blade moves along an inner curved surface of the bones to make an incision. When the cutter blade comes near the knee joint, the turning mechanism turns the lifting and lowering shaft temporarily so that the cutter blade is moved around a tendinous attachment of the knee joint from the inner curved surface to cut the tendon.

As described above, when the cutter blade reaches the knee joint while the bone-in leg is lifted, the clamp unit is turned by the setting angle by the turning mechanism so that the cutter blade is moved around the tendious attachment of the knee joint from the inner curved surface of the bones to cut the tendon. Thus, the tendon firmly attached to the knee joint can be firmly separated. As a result, the following meat separating step can be smoothly performed, and thus the meat yield is improved. By means of the turning mechanism, the clamp unit can turn precisely by the setting angle to cut the tendon attached to the knee joint.

The clamp unit alone is lifted without moving the unit with the incision knife. Thus, the lift unit for moving the heavy incision knife unit upward is not needed. According to the deboning device of the other aspect of the present invention, the light clamp unit is lifted instead of the heavy incision knife unit. The incision making station can be simplified and made at lower cost and the positioning of the bone-in leg at the setting height can be performed at high precision.

The deboning device of the other aspect of the present invention, may further include an input station which comprises: a rotation member which is disposed in a vicinity of an input position at which the bone-in leg is inputted and is rotated around a central axis thereof; a plurality of suspension brackets each of which has an concave part from which the bone-in leg is suspended by the ankle; and a pusher which pushes the bone-in leg to the clamp unit when the bone-in leg suspended from the suspension bracket comes to an opposite position of the input position so as to load the bone-in leg onto the clamp unit.

By synchronizing the movement of the suspension brackets and the movement of the clamp unit, the bone-in leg is securely loaded from the suspension bracket onto the clamp unit can be firmly. The loading of the bone-in leg from the suspension bracket to the clamp unit is automated. It is also possible to simplify the structure of the input station where the bone-in leg is hanged in the clamp unit.

Alternatively, the bone-in leg can be hanged in the suspension bracket manually by an operator, or automatically by loading the bone-in leg by means of an conveyor carrying the bone-in leg to the input station.

The deboning device may further include: a brake shoe which is mounted on a base part supporting the guide bar and is supported turnably on a shaft axis thereof; a spring member which applies spring force to the brake shoe in a direction of pushing the brake shoe toward the rotation shaft; and a brake release rail which is arranged in a transferring direction of the brake shoe between the work stations and is configured to hold the brake shoe away from the rotation shaft against the spring force of the spring member.

In this manner, the brake shoe is pressed against the rotation shaft while the rotation shaft is at the work station so as to prevent the rotation shaft from falling. While the rotation shaft is moved between the stations, the brake shoe is released from the rotation shaft so as to allow the rotation shaft to move downward.

ADVANTAGEOUS EFFECTS OF INVENTION

According to the deboning method of the aspect of the present invention, the method includes the steps of: clamping the bone-in leg at an ankle thereof by a clamp unit; transferring the clamp unit intermittently between a plurality of work stations; and performing at least one of an incision-making step of making an incision on the bone-in leg longitudinally by moving a cutter blade along the bones and a meat-separating step of separating a meat part of the bone-in leg from the bones by lifting the bone-in leg relatively upward while holding down the meat part from above by means of a meat separator and cutting a tendon with a cutter blade. The deboning device may include: a lifting and lowering shaft whose lower end is attached to the clamp unit and which has a lifting and lowering roller above the clamp unit; an elevating unit which is provided in each of the work stations and includes a drive motor, a threaded shaft connected to an output shaft of the drive motor and a lifting and lowering table threadably mounted on the threaded shaft; and a traveling path which is arranged between the work stations and slopes downward in a transferring direction of the clamp unit. The incision-making step or the meat-separating process can be performed at one of the working stations by placing the lifting and lowering roller on the lifting and lowering table and lifting the bone-in leg by lifting the lifting and lowering table. The lifting and lowering roller can travel in the traveling path under weight of the bone-in leg to transfer the clamp unit downward from one work station to a subsequent work station. As a result, the elevating unit and the transferring mechanism between the work stations can be simplified and the required power of the drive unit can be reduced, thereby achieving lowering the cost.

According to the deboning device of the other aspect of the present invention, the device includes a plurality of work stations at which at least one of an incision-making process of making an incision on the bone-in leg longitudinally by moving a cutter blade along the bones and a meat-separating process of separating a meat part of the bone-in leg from the bones by lifting the bone-in leg relatively upward while holding down the meat part from above by means of a meat separator and cutting a tendon with a cutter blade is performed; a clamp unit which clamps the bone-in leg at an ankle thereof; a transferring mechanism which intermittently transfers the clamp unit from one work station to another; a lifting and lowering shaft whose lower end is attached to the clamp unit and which has a lifting and lowering roller above the clamp unit; an elevating unit which is provided in each of the work stations and comprises a drive motor, a threaded shaft connected to an output shaft of the drive motor and a lifting and lowering table threadably mounted on the threaded shaft; and a traveling path which is arranged between the work stations and slopes downward in a transferring direction of the clamp unit. The incision-making process or the meat-separating process is performed at one of the working stations by placing the lifting and lowering roller on the lifting and lowering table and lifting the bone-in leg by lifting the lifting and lowering table. The lifting and lowering roller travels in the traveling path under weight of the bone-in leg to transfer the clamp unit downward from one work station to a subsequent work station. Therefore, the same function effect as the method of the first aspect of the present invention can be achieved.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

A first preferred embodiment is explained in reference to FIG. 1 to FIG. 10. In the first preferred embodiment, the device and method of the present invention are applied to a deboning of a bone-in leg of a poultry carcass. An overall structure of the deboning process is explained in reference to FIG. 1 and FIG. 2A through FIG. 2D. As shown in FIG. 2A, the bone-in leg of the poultry carcass, hereinafter called "work w" consists of a bone part including an ankle f, an ossa cruris (lower thigh leg bone) k, a femur j and a meat part m surrounding the bone part. The ossa cruris k and the femur j are connected by a knee joint.

Figure 1:
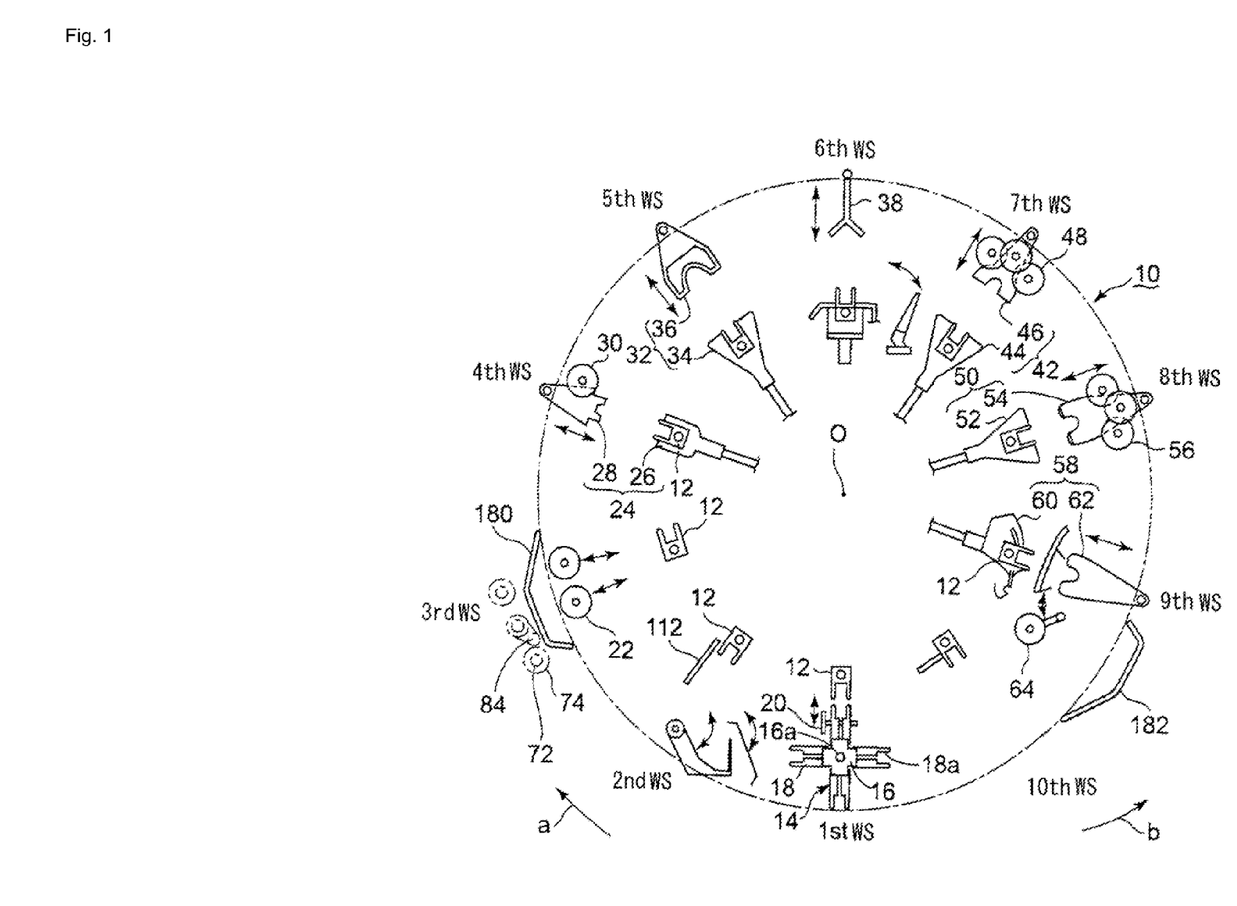
FIG. 1
FIG. 1 is an overall structure of a deboning device in relation to a first preferred embodiment in which the present invention is applied to a deboning of a poultry carcass.
Figure 2A:
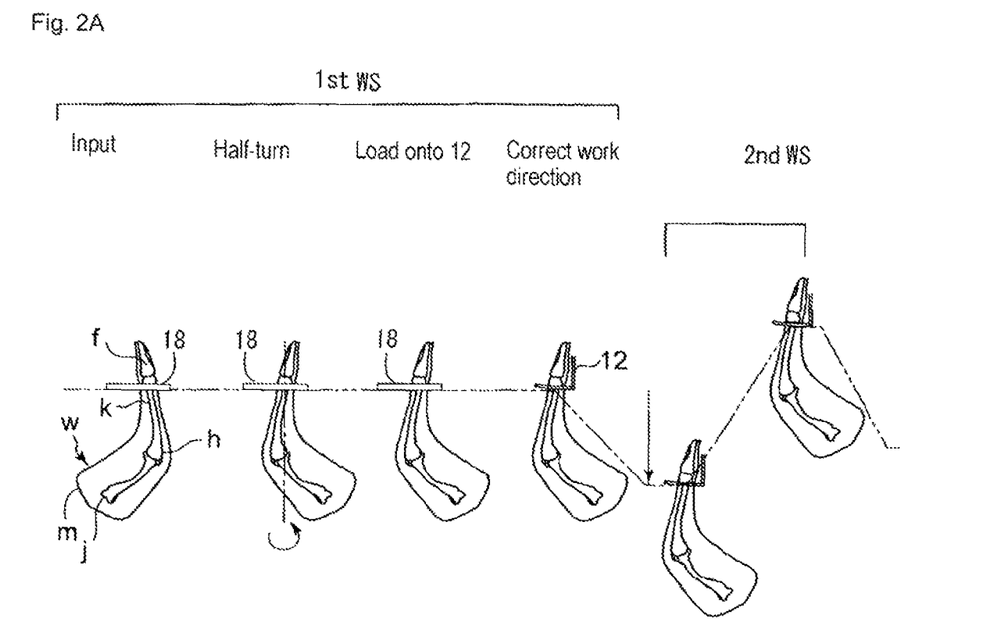
FIG. 2A
FIG. 2A is a chart showing a process from an input station to a second work station of the preferred embodiment.
Figure 2B:
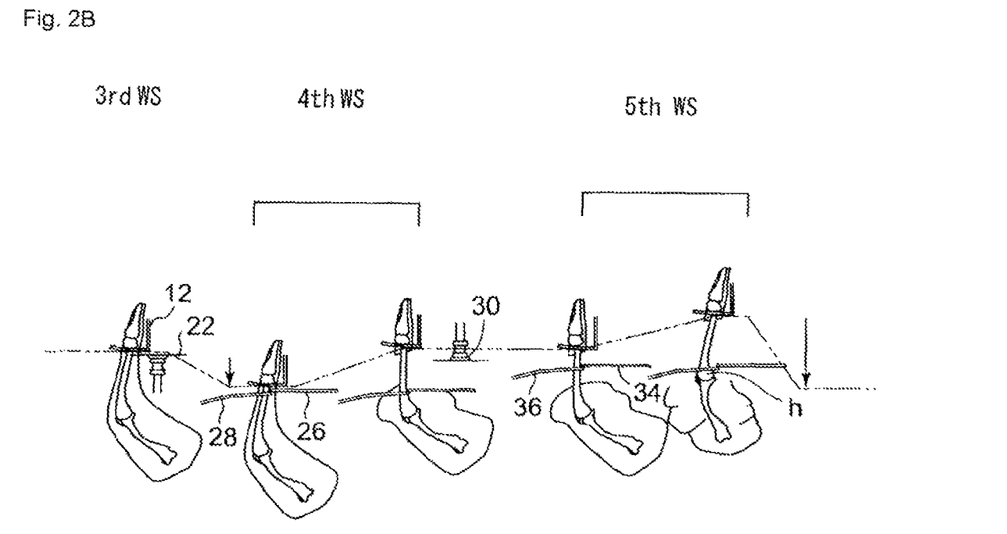
FIG. 2B
FIG. 2B is a chart showing a process from third through fifth work stations of the preferred embodiment.
Figure 2C:
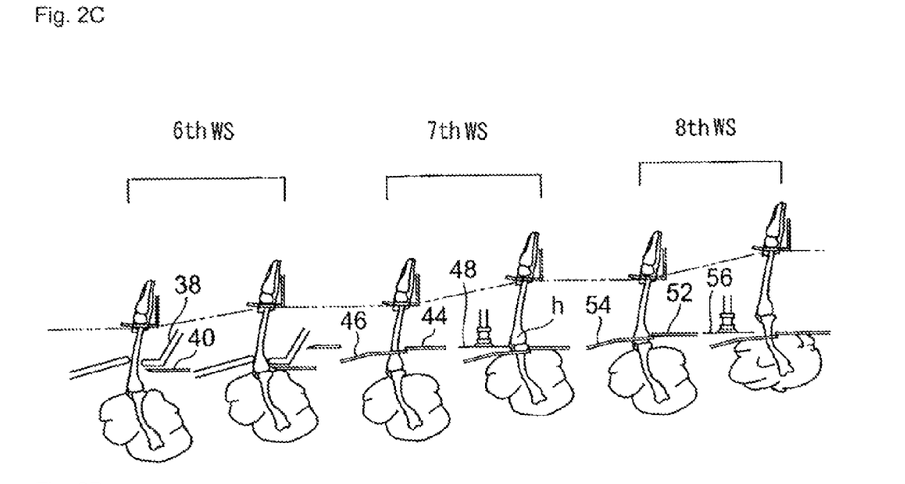
FIG. 2C
FIG. 2C is a chart showing a process from sixth through eighth work stations of the preferred embodiment.
Figure 2D:
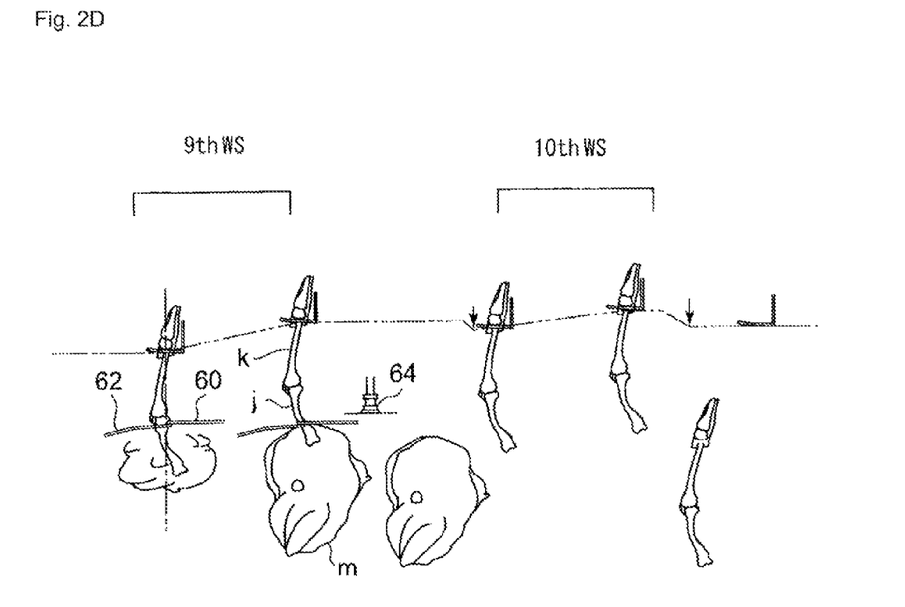
FIG. 2D
FIG. 2D is a chart showing a process from ninth through tenth work stations of the preferred embodiment.
Figure 4:
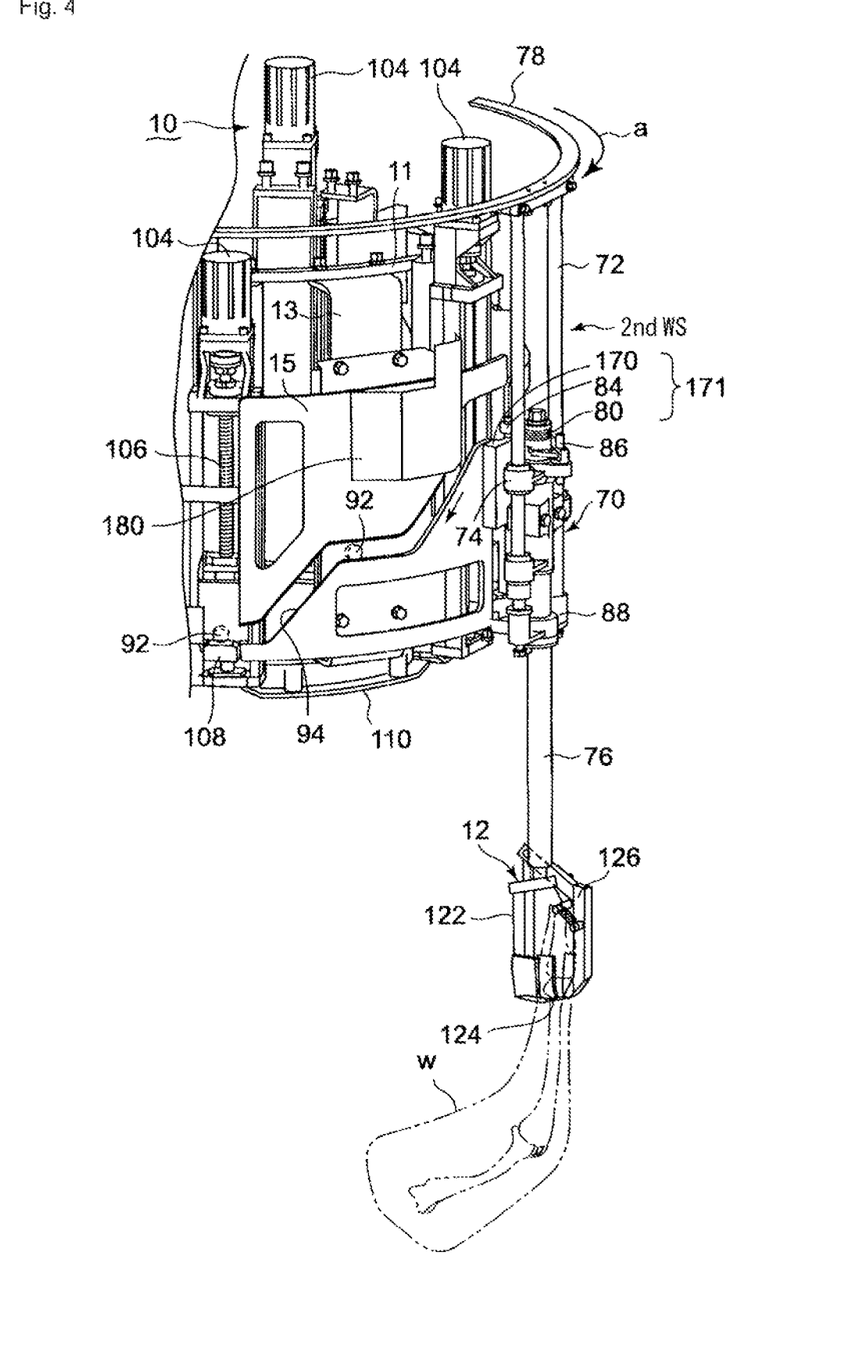
FIG. 4
FIG. 4 is a perspective view around an incision-making station of the deboning device.

As shown in FIG. 1 and FIG. 4, the deboning device 10 has work stations disposed in a circle. At the work stations, input of the work to final separation of the meat part is performed. The work w is suspended from a clamp unit 12. The clamp unit 12 is connected to a circular transferring member 78 via a guide bar 72 of a lifting and lowering shaft 70. The circular transferring member 78 rotates intermittently in the direction of an arrow a. The clamp unit 12 moves following a circular track around a rotation center O from one work station to another work station and stops at each work station. A servomotor 104 is provided to lift and lower the clamp unit 12 at each work station.

Figure 3:
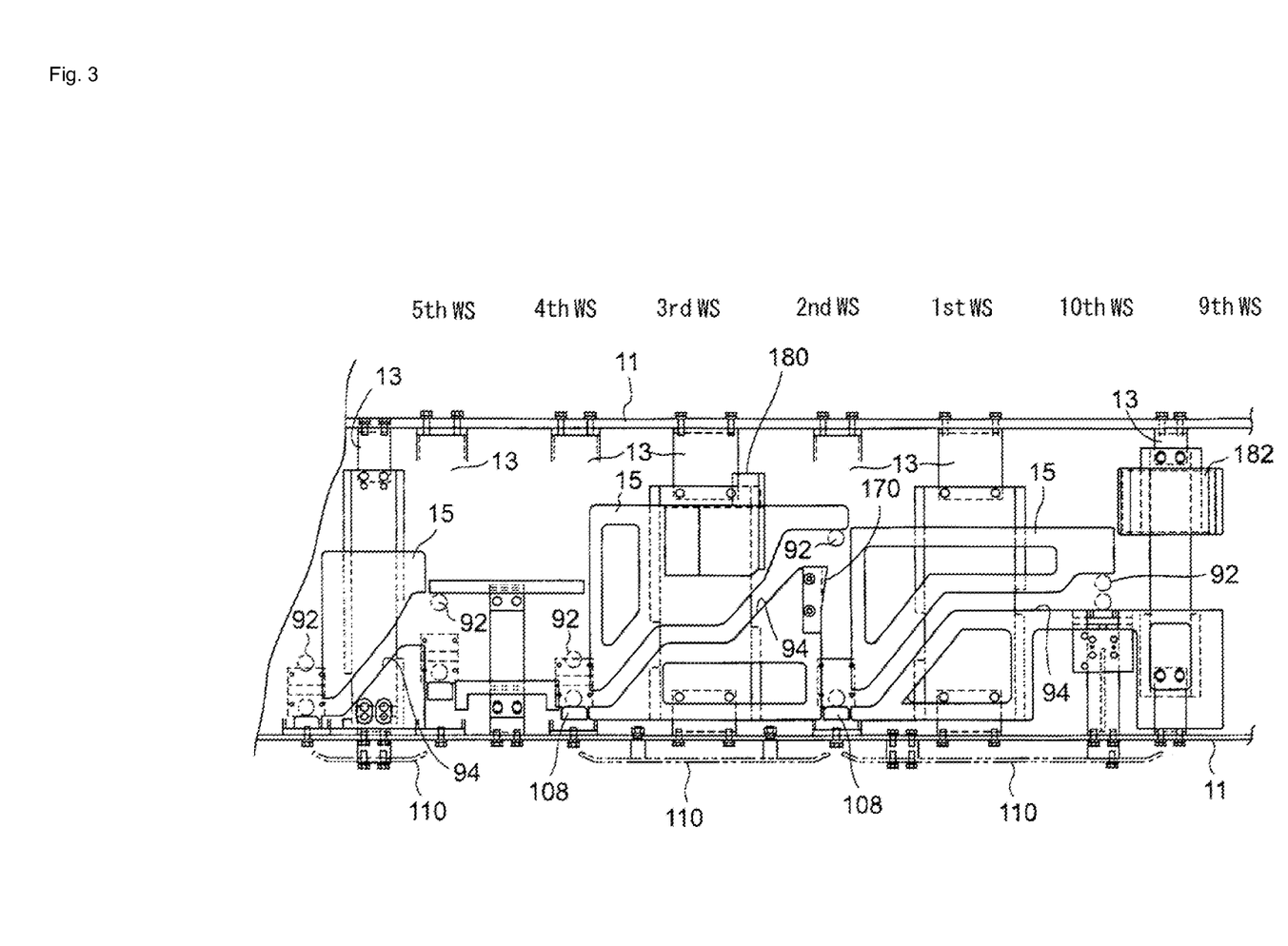
FIG. 3
FIG. 3 is an open-front view of the deboning device of the preferred embodiment.

FIG. 3 shows a circular supporting girder 11 arranged in an upper part and a lower part of the deboning device 10. The servomotor 104 and a supporting frame 13 are fixed to the supporting girder 11. The supporting frame 13 supports an outer panel 15 and the like that constitute a traveling path 94. The supporting girder 11 is not shown in FIG. 5.

FIG. 1 is an illustration of a deboning device for a left leg. The left-leg deboning device has first through tenth work stations arranged in the direction of the arrow a in the order. In contrast, a deboning device for a right leg, the first through tenth work stations are arranged in this order in the direction of an arrow b.

The work w is loaded in the clamp unit 12 via an input unit 14 provided in the first work station, i.e. input station. The input unit 14 includes a rotation member 16, four suspension brackets 18 and a pusher 20. The rotation member 16 intermittently rotates around a vertical shaft 16a. The suspension brackets 18 disposed around the rotation member 16 at equal intervals. The pusher 20 is arranged in such a place as to face the clamp unit 12. The rotation member 16 rotates intermittently making a 90-degree turn each time in synchronization with the intermittent advancing motion of the clamp unit 12. Each of the suspension brackets 18 has a concave part 18a that opens outward. The work w is suspended in the concave part 18a.

The work w may be hanged in the concave part 18a of the suspension bracket 18 manually by an operator or automatically by loading the work w in the concave part 18a by means of an conveyor carrying the work w to the first work station, i.e. the input station and an unshown loading unit loading the work automatically in the concave part 18a.

The suspension bracket 18 with the work w is rotated intermittently and stopped at the position to face the clamp unit 12. At the position, the pusher 20 pushes the work w to the clamp unit 12 so as to load the work onto the clamp unit 12.

As shown in FIG. 4, the clamp unit 12 is attached to the lower end of the rotation shaft 76 of the lifting and lowering shaft 70. The clamp unit 12 includes a clamp body 122 having a groove 124 and a chuck 126. The ankle f of the work w is inserted in the groove 124. The groove 124 can be opened or closed by the chuck 126. The chuck 126 is automatically operated by an unshown control unit.

After the work w is loaded onto the clamp unit 12, the chuck 126 is automatically operated so as to close the opening of the groove 124. Then, the clamp unit 12 advances to the second work station, i.e. the incision-making station. At the second work station, an incision-making step is performed. In the incision-making step, an incision knife is inserted in the work w and then moved along the bone longitudinally by lifting the work w so as to cut the meat part m. The total length of the work w is measured while making the incision.

Next, the clamp unit 12 is transferred to the third work station. At the third work station, a pair of round cutter blades 22 are positioned with surfaces thereof disposed in a horizontal direction. The round cutter blades 22 approach the work w suspended in the clamp unit 12 so as to cut the tendon attached to the ankle f.

The clamp unit 12 with the work w is transferred to the fourth work station. At the fourth work station, provided is a meat separator 24 including a stationary separator 26 and a movable separator 28. The movable separator 28 is movable in the direction to move closer or away from the stationary separator 26. The meat part m is held between the stationary separator 26 and the movable separator 28. A round cutter blade 30 of the fourth work station cuts a small-bone muscle while the stationary separator 26 and the movable separator 28 hold down the meat part m between them and the clamp unit 12 is pulled up.

The small-bone muscle herein refers to the muscle that is adhered to a small bone which is adhered to the ossa cruris k along a side surface thereof and is a size of a matchstick and that is located along an extending line of the small bone (ankle side). If the small-bone muscle is already cut before the fourth work station at which the meat part m is removed, the small bone might fall out from the ossa cruris k, resulting in bone dislocation at the middle part (knee joint h) between the ossa cruris k and the femur j. Thus, the small-bone muscle is intentionally left uncut at the third work station. The small-bone muscle is cut after removing the meat part m e at the fourth work station.

The work w is transferred to a fifth work station. At the fifth work station, the work w is held down by a meat separator 32 having a stationary separator 34 and a movable separator 36, while the work is lifted so as to expose the knee joint h.

The work w is then transferred to a sixth work station. On the way to the sixth work station, the clamp unit 12 is lowered. Once the work w arrives at the sixth work station, the clamp unit 12 is lifted. While lifting the clamp unit 12, the location of the knee joint h is measured by a measuring unit 38 and x-muscle is cut by a cutter 40.

The x-muscle is the muscle at the knee joint h. The x-muscle must be cut to remove the meat part m from the knee joint h. The cutting of the x-muscle is performed while the work w is transferred to a seventh work station after the location of the knee joint is measured at the sixth work station.

The work w is then transferred to the seventh work station. At the seventh work station, the muscle attached to the knee joint is cut. The lift amount of the work w is set based on the location of the knee joint h measured at the sixth work station. The work w is lifted by the set lift amount while the meat part m is held down by a meat separator 42 consisting of a stationary separator 44 and a movable separator 46. By this, the knee join h is exposed. A set of three round cutter blades 48 cut the muscle attached to the exposed knee joint h.

The work w is transferred to an eighth work station. At the eighth work station, the work w is lifted while the meat part m is held down by a meat separator 50 constituted of a stationary separator 54 and a movable separator 56. The lift amount here is set based on the location of the knee joint h measured at the sixth work station. Then, a set of three round cutter blades 56 cut gristle disposed right below the knee joint h.

The work w is transferred to a ninth work station. A final separation of the meat part m is performed at the ninth work station. At the ninth work station, the work w is lifted while the meat part m is held down by a meat separator 58 constituted of a stationary separator 60 and a movable separator 62. By this, the meat part m is separated from the femur j. The clamp unit 12 is turned 90 degrees and then reversed 90 degrees so that a round cutter blade 64 cuts the tendon attached to an end of a head bone of femur j during the turning and reversing of the clamp unit 12. By this, the meat part m is removed from the bone part and the removed meat part m falls in an unshown ejection path so as to be ejected.

At the tenth work station, the chuck 126 of the clamp unit 12 is actuated to open the clamp unit 12, thereby allowing the bone part from which the meat part m has been removed fall from the clamp unit 12. The bone part is dropped in another ejection path different from that for the meat part m and then ejected.

Now, the incision-making process performed at the second work station, i.e. incision-making station, is explained in detail in reference to FIG. 3 through FIG. 10. FIG. 4 illustrates a state wherein the clamp unit 12 with the work w suspended therein is at the second work station.

Figure 5:
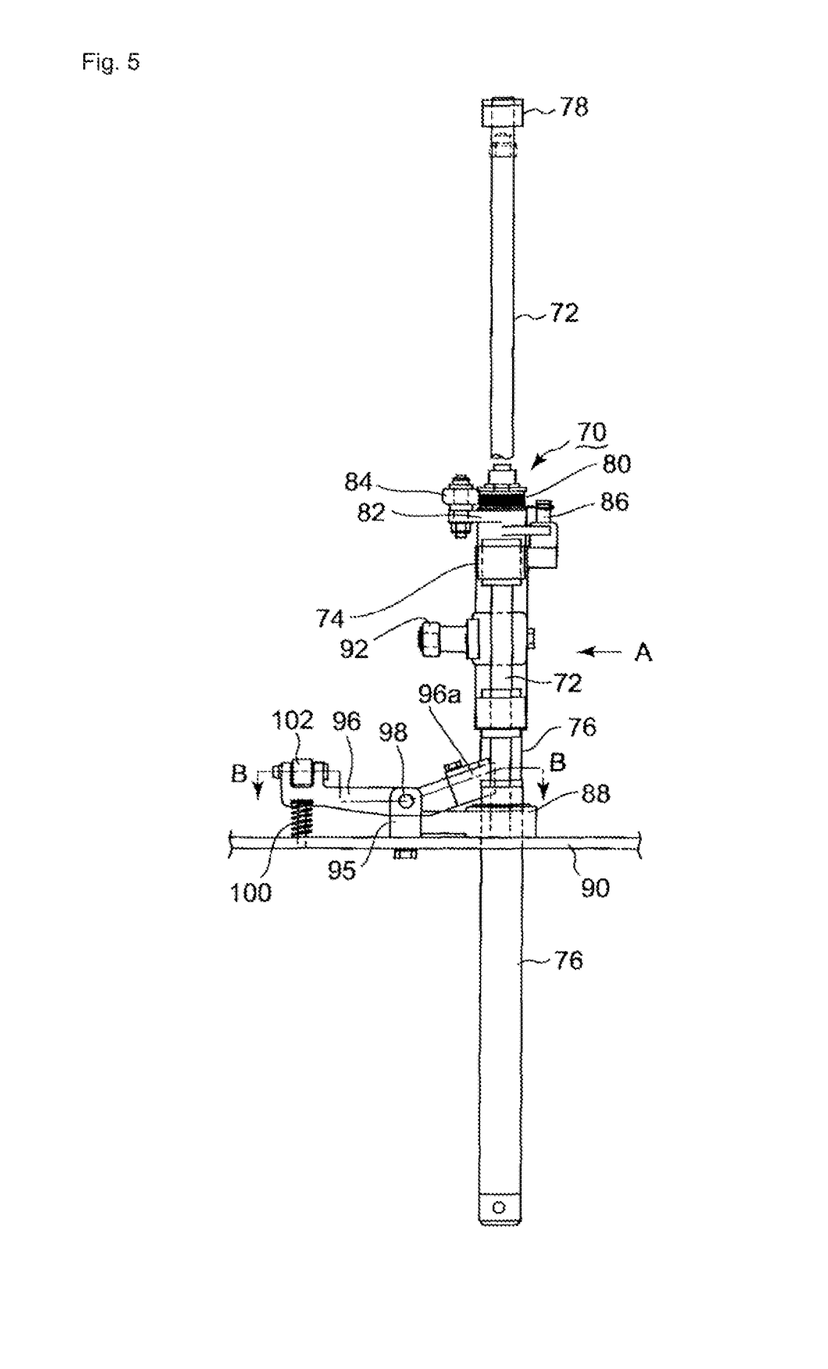
FIG. 5
FIG. 5 is a side view of a lifting and lowering shaft 70 of the deboning device.
Figure 6:
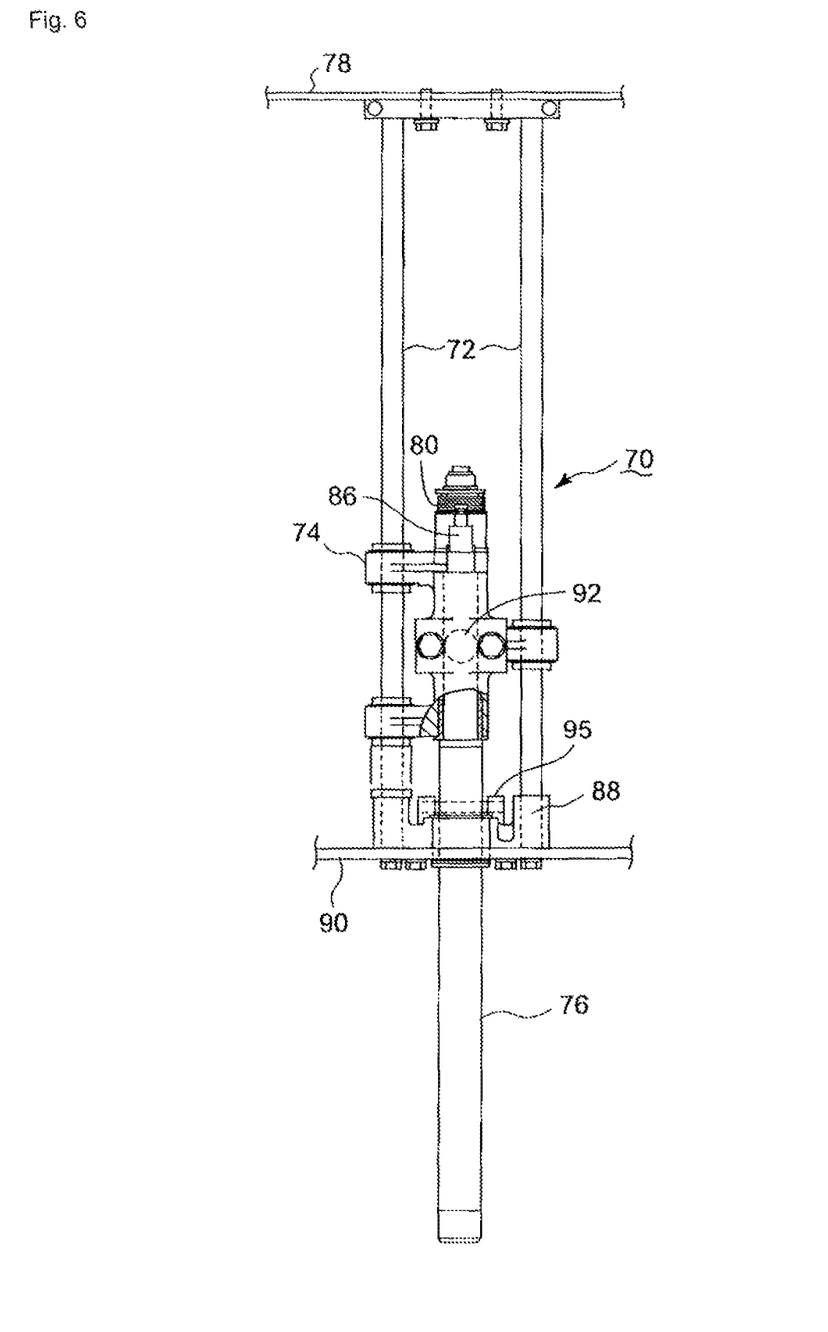
FIG. 6
FIG. 6 is a front view of the lifting and lowering shaft 70 taken from A direction of FIG. 5.

As shown in FIG. 4 through FIG. 6, the lifting and lowering shaft 70 includes a pair of guide bars 72 disposed in a vertical direction, a sliding bracket 74 which is slidable along the guide bars 72 and a rotation shaft 76 which is coaxially arranged inside of the sliding bracket 74. The clamp unit 12 is mounted on a lower end of the rotation shaft 76. Upper ends of the guide bars 72 are fastened to the circular transferring member 78. The circular transferring member 78 is rotated continually by a setting angle by an unshown drive unit. Lower ends of the guide bars 72 are fixed to a circular base 90 via a fixing member 88. The circular base 90 is unshown in FIG. 4 and shown in FIG. 5 and FIG. 6.

The first through tenth work stations are arranged at equal intervals around the rotation center o. Thus, the clamp unit 12 is transferred from one station to another station for each rotational movement. FIG. 4 shows only one clamp unit 12. In the actual device, a plurality of lifting and lowering shafts 70 are fastened to the circular transferring member 78 so that there is one clamp unit 12 at each of the work stations.

The rotation shaft 76 has a coil spring 80 winded at the upper end. Near the coil spring 80, a swinging roller 84 is mounted on the rotation shaft 76 via an arm 82. One end of the coil spring 80 is fixed to a metal fixing member 86 which is integrally formed with the sliding bracket 74. The spring force of the coil spring 80 is applied to the rotation shaft 76 around the shaft.

A lifting and lowering roller 92 is mounted on the sliding bracket 74 below the swinging roller 84. The traveling path 94 is disposed between the work stations. The traveling path 94 has a guide channel in which the lifting and lowering roller 92 travels. When transferring the clamp unit 12 from one work station to another, a vertical position of the clamp unit 12 can be controlled by moving the lifting and lowering roller 92 in the traveling path 94.

Figure 7:
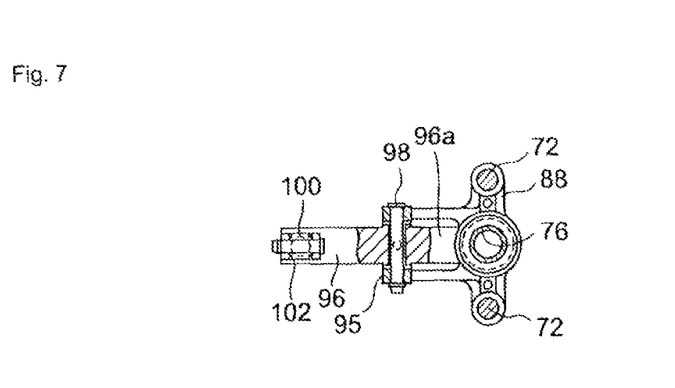
FIG. 7
FIG. 7 is a section view of the lifting and lowering shaft 70 taken along B-B line of FIG. 5.

As shown in FIG. 7, a shaft bearing 95 is provided on a top surface of the circular base 90 and a base part 96 and a brake shoe 96a integrally formed with the base part 96 are mounted in the shaft bearing 95 rotatably around a pin 98. The brake shoe 96a is directed slightly obliquely upward. A coil spring 100 is mounted on the base part 96. The coil spring 100 applies spring force in the direction of pushing the shoe brake 96a toward an outer surface of the rotation shaft 76. By this, the rotation shaft 76 is prevented from falling when the clamp unit 12 is at each of the work stations.

As shown in FIG. 4, the work w is lifted at each work station mainly by a means which uses a servomotor 104 as a drive unit. The servomotor 104 is provided at each of the work stations. An output shaft of the servomotor 104 is coupled to a threaded shaft 106. A lifting and lowering block 108 is threadably mounted on the threaded shaft 106. The rotation of the threaded shaft 106 rises the lifting and lowering block 108.

At each station, the lifting and lowering roller 92 travels in the traveling path 94. Once the lifting and lowering roller 92 reaches the top surface of the lifting and lowering block 108, the servomotor 104 is actuated to lift the lifting and lowering block 108 as well as the lifting and lowering roller 92. When the lifting and lowering roller 92 is lifted, the rotation shaft 76 is lifted as well as the sliding bracket 74 being integral with the lifting and lowering roller 92, thereby lifting the work w. The lift amount of the lifting and lowering block 108 is set based on the rotation speed of the servomotor 104.

During the lifting of the rotation shaft 76, the brake shoe 96a is pressed against the rotation shaft 76 to prevent the rotation shaft 76 from falling. A roller 102 is provided on the top surface of the base part 96. As illustrated in FIG. 3, a guide rail 110 is fixed to the supporting girder 11 below the area where the traveling path 94 is arranged downward in the direction of the arrow a. In this area, when the lifting and lowering roller 92 travels in the traveling path 94, the roller 102 gets under the guide rail 110 so that the guide rail 110 pushes down the base part 96. By pushing down the base part 96, the brake shoe 96a moves away from the rotation shaft to release the rotation shaft 76 downward. By this, the lifting and lowering roller 92 travels downward in the traveling path 94.

As FIG. 3 shows, the supporting girder 11 is fixed to the guide rail 110 under the traveling path 94 in the area where the traveling path 94 is disposed downward with respect to the transferring direction of the clamp unit 12. By means of the guide rails 110 provided in the work stations, the brake shoe 96a moves away from the rotation shaft 76 before the lifting and lowering roller 92 enters the traveling path 94. By this, the rotation shaft 76 is released to fall and thus the clamp unit 12 can move downward.

Figure 8:
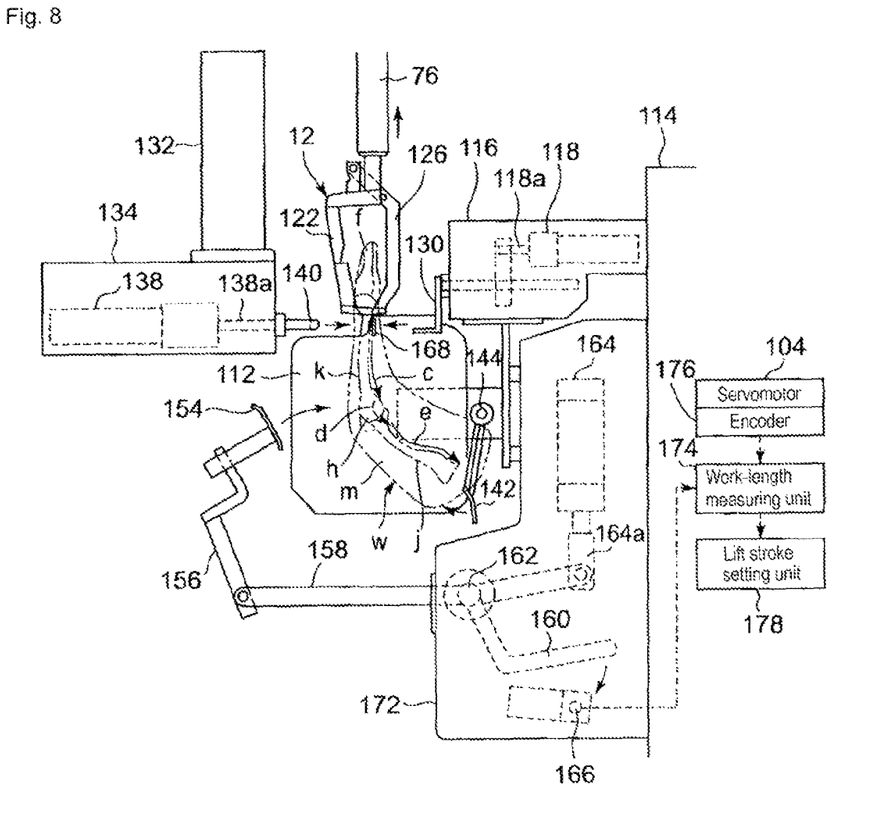
FIG. 8
FIG. 8 is a front view of an incision-making station of the deboning device.
Figure 9:
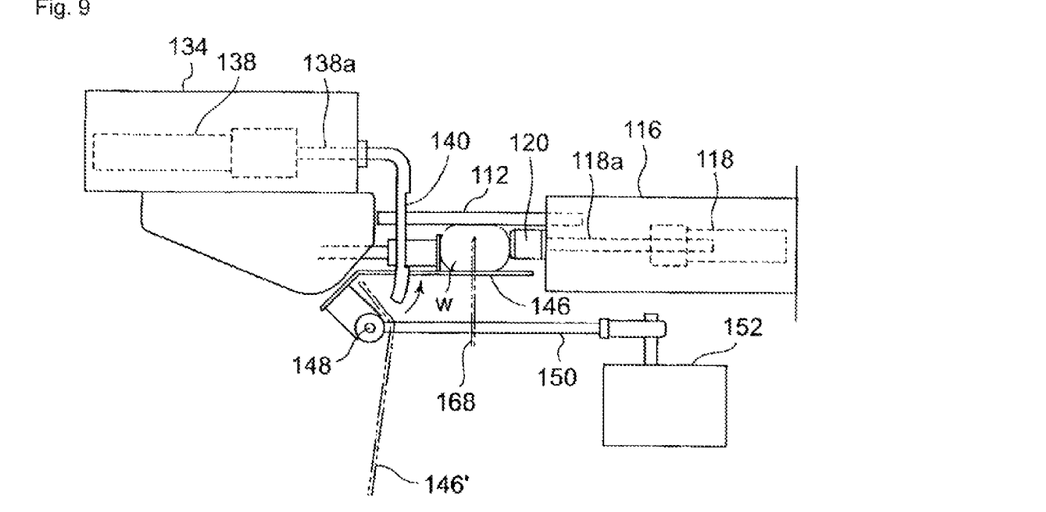
FIG. 9
FIG. 9 is a plain view of the incision-making station.
Figure 10:
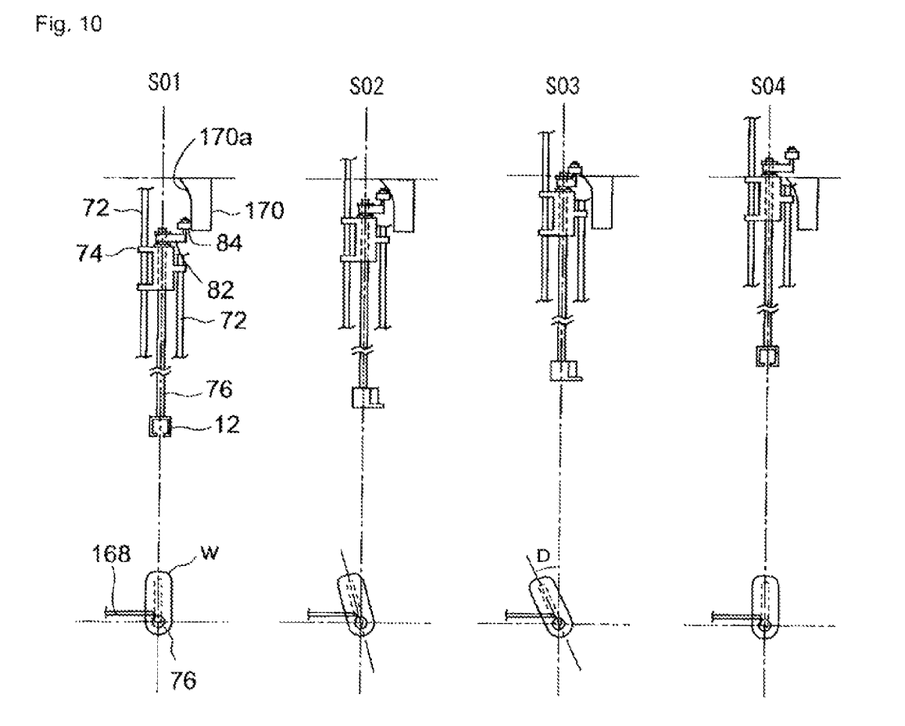
FIG. 10
FIG. 10 is a process chart showing an incision-making step from S01 to S04 at the incision-making station.

The incision-making process at the second work station, i.e. the incision-making station is explained in reference to FIG. 8 to FIG. 10. In FIG. 8 and FIG. 9, an attitude holding plate 112 with a flat surface is disposed in a vertical direction such as to traverse the transferring path of the work w. The work w (left leg) suspended from the clamp unit 12 is transferred from the first work station (input station) and stopped in contact with the attitude holding plate 112. In the case of transferring the right leg, the curved profile of the bone part is axially symmetrical to the work w (left leg) in FIG. 8.

On the right side of the attitude holding plate 112, a casing 116 fixed to a base 114 is provided. An air cylinder 118 is housed in the casing 116. A right pusher 130 is connected to a piston rod 118a of the air cylinder 118. On the left side of the attitude holding plate 112, a casing 134 fixed to a base 132 is provided. An air cylinder 138 is housed in the casing 134. A left pusher 140 is connected to a piston rod 138a of the air cylinder 138.

Under the right pusher 130, a lower pusher 142 is provided. The lower pusher 142 is connected to a turning shaft 144. An air cylinder unshown as a drive source, turns the turning shaft 144 to move the lower pusher 142 closer to or away from the work w.

When the work w comes in contact with the attitude holding plate 112 and stopped, the right pusher 130, the left pusher 140 and the lower pusher 142 move toward the work w. The work w is held from three directions by the right pusher 130, the left pusher 140 and the lower pusher 142 and pressed against the attitude holding plate 112 and immobilized there.

In FIG. 9, a holding plate 146 is disposed in a vertical direction across from the attitude holding plate 112. The holding plate 146 is connected to an arm 150 and is turnable around the turning shaft 148. The arm 150 is actuated by a drive unit 152 in the direction to turn the turning shaft 148.

When the work w comes in contact with the attitude holding plate 112 and stopped there, the holding plate 146 is turned to move closer to the work w. One flat side of the work w is pressed by the holding plate 146 so as to press other flat side of the work w against the attitude holding plate 112 and immobilize the work w there.

Below the right pusher 140, a measuring plate 154 is secured to an end of a first arm 156. The first arm 156 is connected to a second arm 158. A branch arm 160 is integrally connected to the second arm 158. A connection part of the second arm 158 and the branch arm 160 is turnable around a turning shaft 162 disposed in the housing 172. Other end of the second arm 158 is connected to a piston rod 164a of an air cylinder 164 that is housed in a housing 172. The measuring plate 154 is movable toward or away from the work w by means of the air cylinder 164.

Right below the clamp unit 12, an incision knife 168 is disposed toward the work w. The incision knife 168 is capable of moving toward or away from the work w by means of unshown drive unit.

As described above, after the work w is stopped in contact with the attitude holding plate 112, the right pusher 130, the left pusher 140 and the lower pusher 142 moves toward the work w so as to hold the work w from three directions. At the same time, the holding plate 146 is turned toward the work w so as to press the flat side of the work w against the attitude holding plate 112 and immobilize the work w there.

Next, the incision knife 168 is inserted near the ankle of the work w and the work w is lifted by the clamp unit 12. By this, the incision knife 168 makes the incision along the inner curved surface of the bones in the direction of the arrow c in FIG. 8. The meat part m and the bones are separated.

FIG. 4 illustrates a cam plate 180 on the outer panel 15 of the second work station (incision-making station). FIG. 10 illustrates a cam 170 with a curved cam surface 170a. As described later, the curved cam surface 170a is formed such that the swinging roller 84 turns by a setting degree in contact with the curved cam surface 170a. A turning mechanism 171 includes the swinging roller 84, the cam 170 and the coil spring 80.

When the incision knife 168 reaches near the knee joint h, the swinging roller 84 comes in contact with the cam surface 170a of the cam plate 170 such as to turn the rotation shaft 76 by the setting degree D, e.g. 30 degrees. By this, the incision knife 168 follow the track indicated with the arrow d in FIG. 8. Specifically, the incision knife 168 moves along the rear surface of the knee joint h to cut the tendon attached to the rear surface.

FIG. 10 illustrates the movement of the incision knife 168 as the clamp unit 12 rises. The incision knife 168 moves in the order of S01 to S04. The incision knife 168 moves near the knee joint h in the order of S01 to S04. S01 of FIG. 10 shows the incision knife 168 at the moment the swinging roller 84 comes in contact with the cam surface 170a. After the swinging roller 84 touches the cam surface 170a, the rotation shaft 76 turns by up to D degrees. S04 of FIG. 10 shows the incision knife 168 when the swinging roller 84 is off the cam surface 170a as the clamp unit 12 is lifted and the rotation shaft 76 makes an inverse turn to its original position by the spring force of the coil spring 80.

When the incision knife 168 reaches the lower side of the knee joint h, the swinging roller 84 comes off from the cam surface 170a. By this, the spring force of the coil spring 80 turns the rotation shaft 76 in the opposite direction to its original position. The incision knife 168 returns to the inner curved surface of the bones at the lower part of the knee joint h. Then, the work w is lowered so that the incision knife 168 makes an incision along the inner curved surface of the bone part as indicated with the arrow e so as to cut the meat part m.

FIG. 8 shows a noncontact sensor 166 in the lower part of the housing 172. After securing the work w against the attitude holding plate 112, the measuring plate 154 moves toward the work w by driving the air cylinder 164 and comes in contact with the work w. In conjunction with the lifting of the work w, the measuring plate 154 moves forward while maintaining the contact with the work w. When the measuring plate 154 reaches the lower end of the work w, the branch arm 160 comes closest to the noncontact sensor 166.

The noncontact sensor 166 detects the moment at which the branch arm 160 reaches the closest point to the noncontact sensor 166, i.e. the measuring plate 154 is in contact with the lower end of the work w. The detected moment is sent to a work-length measuring unit 174.

The rotation speed of the servomotor 104 is detected by an encoder 176. The detected value is sent to the work-length measuring unit 174. The height of the lifting and lowering roller 92 (lift stroke) can be determined based on the detection value. The total length of the bones of the work w is obtained based on the height of the lifting and lowering roller 92 at the moment when the branch arm 160 is detected by the noncontact sensor 166 at its closest point and the position of the measuring plate 154 at the moment when the measuring plate 154 reaches the lower end of the work w. The total length of the bones of the work w obtained in the above manner, is sent to a lift stroke setting unit 178.

The lift stroke setting unit 178 determines which class of large, medium and small the detection value belongs to. The lift stroke setting unit 178 sets the lift stroke in accordance with the determined class. At the ninth work station (final meat separation station), the clamp unit is lifted by the lift amount to separate the bones and the meat part m.

As shown in FIG. 1 and FIG. 3, the cam plates 180 and 182 are arranged at the third work station and between the ninth work station and the tenth work station respectively. At the second work station, the incision is made while lifting the work w. Then, when the clamp unit 12 starts toward the third work station, the roller 102 gets under the bottom surface of the guide rail 110, thereby moving the brake shoe 96a away from the rotation shaft 76. By this, the clamp unit 12 is released to fall, the lifting and lowering roller 92 travels in the travel path 94 while lowering the clamp unit 12.

As FIG. 1 shows, the swinging roller 84 is pressed by the cam plate 180 so as to turn the rotation shaft 76 by the setting angle while the clamp unit 12 is transferred in the third work station. By this, the part of the tendon to be cut near the ankle is positioned to face the pair of round cutter blades 22. The round cutter blades 22 move linearly toward the part of the tendon to be cut so as to cut the tendon attached to the ankle f. Then the clamp unit 12 is transferred and the swinging roller 84 moves away from the cam plate 180. Once the swinging roller 84 is off the cam plate 180, the spring force of the coil spring 80 turn the clamp unit 12 in the inverse direction to its original position.

In the manner similar to above, the swinging roller 84 is pushed by the camp plate 182 so as to turn the clamp unit 12 by 90 degrees while the clamp unit 12 is transferred from the ninth work station to the tenth work station. By this, the part to be cut is positioned to face the round cutter blade 64. The round cutter blade 64 is moved toward the part to be cut as to cut the tendon attached to the end of the head bone of femur j.

According to the preferred embodiment, the elevating unit of the clamp unit 12 includes the servomotor 104, the threaded shaft 106 coupled to the output shaft of the servomotor 104 and the lifting and lowering block 108 which is threadably mounted on the threaded shaft 106. The clamp unit 12 is lowered by moving the lifting and lowering roller 92 in the traveling path 94 disposed between the work stations. Thus, the lifting and lowering mechanism and the transferring mechanism of the work w is simplified and the required power of the servomotor 104 is reduced, thereby achieving lowering the cost. By using the servomotor 104 as the drive motor, the height of the work w is precisely controlled.

The clamp unit 12 is turned by the setting angle so as to position the part to be cut to face the round cutter blades 22 or the round cutter blade 64. The moving pathway of the round cutter blades can be approximately linear. Thus, the pathway of the round cutter blade can be simplified, thereby simplifying the moving mechanism thereof and lowering the cost.

The bone-in leg is moved upward or downward instead of moving the heavy incision making unit with the incision knife in the vertical direction. Thus, there is no need for a lifting and lowering unit specifically for the heavy incision making unit. This can simplify the incision-making station and lower the cost. In contrast to the deboning device of Patent Document 1 having the incision making station and the deboning device body installed separately, the incision making station is integrated in the deboning device 10. Thus, the overall size of the deboning device can be smaller.

When the incision knife 168 reaches the knee joint h, the clamp unit 12 is turned by the setting angle so as to move the incision knife 168 around a tendious attachment of the knee joint h from the inner curved surface of the bones. Thus, the tendon firmly attached to the knee joint h can be separated. As a result, the separation of the bone part and meat part can be performed smoothly and the yield rate of the meat is improved.

At the second work station (the incision making station), the total length of the work w is detected. It is determined which class of large, medium and small the detected value belongs to and the lift amount of the clamp unit 12 at the ninth work station (final separation station) is set. Thus, individual differences in the length of the work does not affect while the meat part and bone part are firmly separated. The length of the work w is categorized into three classes which are large, medium and small, and thus the controlling thereof is simplified and the cost of the control unit can be reduced.

By constituting the turning mechanism 171 solely of mechanical devices such as the swinging roller 84, the coil spring 80 and the cam 170, a complicated electronic control unit can be eliminated, the clamp unit 12 can be turned with high precision and the cost thereof can be reduced.

By providing the input unit 14, the structure of the deboning device 10 at the input station can be simplified and the work w can be firmly hanged in the clamp unit 12.

By pressing the brake shoe 96a against the rotation shaft 76 while the clamp unit 12 is lifted by means of the servomotor 104 at each work station, the rotation shaft 76 is prevented from falling. By releasing the brake shoe 96a by means of the guide rail 110 while the clamp unit 12 is moving between the work stations, the lifting and lowering roller 92 can travel in the traveling path 94 smoothly and the clamp unit 12 can be lowered smoothly.

Industrial Applicability

According to the present invention, in the automated deboning device for deboning the bone-in leg of livestock carcasses, the mechanism for moving the cutter blades in the cutting process can be simplified and cheaper as well as simplifying the moving mechanism of the cutter blades and reducing the cost by reducing the required power.

The invention claimed is:

1. A method for deboning a bone-in leg by a deboning device, the method comprising the steps of:

clamping the bone-in leg at an ankle thereof by a clamp unit;
transferring the clamp unit intermittently between a plurality of work stations; and
performing in each of the work stations at least one of an incision-making process of making an incision on the bone-in leg longitudinally by moving a cutter blade along the bones and a meat-separating process of separating a meat part of the bone-in leg from the bones by lifting the bone-in leg relatively upward while holding down the meat part from above by a meat separator and cutting a tendon with a cutter blade,
wherein the deboning device comprises: a lifting and lowering shaft whose lower end is attached to the clamp unit and which has a lifting and lowering roller above the clamp unit; an elevating unit which is provided in each of the work stations and comprises a drive motor, a threaded shaft connected to an output shaft of the drive motor and a lifting and lowering table threadably mounted on the threaded shaft; and a traveling path which is arranged between the work stations and slopes downward in a transferring direction of the clamp unit,
wherein the incision-making process or the meat-separating process is performed at one of the plurality of working stations by placing the lifting and lowering roller on the lifting and lowering table and lifting the bone-in leg by lifting the lifting and lowering table, and
wherein the lifting and lowering roller travels in the traveling path under weight of the bone-in leg to transfer the clamp unit downward from one work station to a subsequent work station.

2. The method for deboning the bone-in leg according to claim 1,
wherein the deboning device further comprises a turning mechanism which is provided in at least one of the work stations having the cutter blade and turns by a setting angle the lifting and lowering shaft which is turnable around a shaft center thereof,
wherein the turning mechanism turns the lifting and lowering shaft so that a part to be cut of the bone-in leg faces the cutter blade, and
wherein the cutter blade is moved toward the part to be cut of the bone-in leg along a linear pathway to cut the part to be cut of the bone-in leg.

3. The method for deboning the bone-in leg according to claim 2,
wherein the cutter blade is a tendon cutter blade constituted of a round blade which is arranged in a horizontal direction, the tendon cutter blade cutting a tendon which is attached to the bones.

4. The method for deboning the bone-in leg according to claim 2,
wherein at least one of the work stations is an incision-making station at which the incision-making process is performed, wherein the incision-making process comprises:
an ossa-cruris incision step of making an incision from around the ankle to an upper part of the knee joint by lifting the bone-in leg relatively upward with respect to the cutter blade while moving the cutter blade along an inner curved surface of the bones;
a knee joint incision step of making an incision on the tendon by turning the lifting and lowering shaft temporarily so that the cutter blade is moved around a tendious attachment of the knee joint from the inner curved surface of the bones and then reversing the clamp unit to return the inner curved surface of the bones to face the cutter blade; and a femur incision step of making an incision from a lower part of the knee joint to an end of the femur by lifting the bone-in leg relatively upward with respect to the cutter blade while moving the cutter blade along the inner curved surface of the bones.

5. The method for deboning the bone-in leg according to claim 4,
wherein, in the incision-making step, a lower end of the bone-in leg is detected while the bone-in leg is lifted and a total length of the bones of the bone-in leg is calculated based on a height at which the detection is performed and a lift amount of the bone-in leg when the lower end of the bone-in leg is detected, and
wherein a lift amount of the clamp unit in a final meat-separation process with respect to a meat separator holding down the meat part, is set in accordance with the total length of the bone-in meat having been obtained.

6. A device for deboning a bone-in leg, comprising:
a plurality of work stations at which at least one of an incision-making process of making an incision on the bone-in leg longitudinally by moving a cutter blade along the bones and a meat-separating process of separating a meat part of the bone-in leg from the bones by lifting the bone-in leg relatively upward while pressing the meat part from above by a meat separator and cutting a tendon with a cutter blade is performed;
a clamp unit which clamps the bone-in leg at an ankle thereof;
a transferring mechanism which intermittently transfers the clamp unit from one work station to another;
a lifting and lowering shaft whose lower end is attached to the clamp unit and which has a lifting and lowering roller above the clamp unit;
an elevating unit which is provided in each of the work stations and comprises a drive motor, a threaded shaft connected to an output shaft of the drive motor and a lifting and lowering table threadably mounted on the threaded shaft;
a traveling path which is arranged between the work stations and slopes downward in a transferring direction of the clamp unit,
wherein the incision-making process or the meat-separating process is performed at one of the working stations by placing the lifting and lowering roller on the lifting and lowering table and lifting the bone-in leg by lifting the lifting and lowering table, and
wherein the lifting and lowering roller travels in the traveling path under weight of the bone-in leg to transfer the clamp unit downward from one work station to a subsequent work station.

7. The device for deboning the bone-in leg according to claim 6, further comprising:
a turning mechanism which is provided in at least one of the work stations having the cutter blade and turns by a setting angle the lifting and lowering shaft which is turnable around a shaft center thereof,
wherein the turning mechanism turns the lifting and lowering shaft so that a part to be cut of the bone-in leg faces the cutter blade and the cutter blade is moved toward the part to be cut of the bone-in leg along a linear pathway to cut the part to be cut of the bone-in leg.

8. The device for deboning the bone-in leg according to claim 7,
wherein the lifting and lowering shaft comprises a guide bar which is fixed to the transferring mechanism, a sliding bracket which slides upward and downward along the guide bar and a rotation shaft which is arranged rotatably within the sliding bracket and whose lower end is attached to the clamp unit,
wherein the turning mechanism comprises a swinging roller attached to the rotation shaft, a cam member which pushes the swinging roller when the clamp unit is lifted and the cutter blade is moved closer to a knee joint so as to turn the rotation shaft by the setting angle and a spring member which returns the swinging roller to an original position when the clamp unit is further lifted and the swinging roller moves away from the cam member.

9. The device for deboning the bone-in leg according to claim 8, further comprising:
a brake shoe which is mounted on a base part supporting the guide bar and is supported turnably on a shaft axis thereof;
a spring member which applies spring force to the brake shoe in a direction of pushing the brake shoe toward the rotation shaft; and
a brake release rail which is arranged in a transferring direction of the brake shoe between the work stations and is configured to hold the brake shoe away from the rotation shaft against the spring force of the spring member.

10. The device for deboning the bone-in leg according to claim 7,
wherein the cutter blade is a tendon cutter blade constituted of a round blade which is arranged in a horizontal direction, the tendon cutter blade cutting a tendon which is attached to the bones.

11. The device for deboning the bone-in leg according to claim 7,
wherein at least one of the work stations is an incision-making station which comprises the cutter blade capable of moving toward and away from the bone-in leg, an attitude holding plate which is disposed to face a moving direction of the cutter blade and a pressing member which presses a flat side of the bone-in leg against the attitude holding plate, the turning mechanism turning the lifting and lowering shaft by a prescribed angle in the middle of moving upward,
wherein the cutter blade is inserted near the ankle of the bone-in leg in such a state that the pressing member presses the bone-in leg against the attitude holding plate, the clamp unit is lifted such that the cutter blade moves along an inner curved surface of the bones to make an incision, and
wherein, when the cutter blade comes near the knee joint, the turning mechanism turns the lifting and lowering shaft temporarily so that the cutter blade is moved around a tendinous attachment of the knee joint from the inner curved surface to cut the tendon.

12. The device for deboning the bone-in leg according to claim 6, further comprising an input station which comprises: a rotation member which is disposed in a vicinity of an input position at which the bone-in leg is inputted and is rotated around a central axis thereof; a plurality of suspension brackets each of which has an concave part from which the bone-in leg is suspended by the ankle; and a pusher which pushes the bone-in leg to the clamp unit when the bone-in leg suspended from the suspension bracket comes to an opposite position of the input position so as to load the bone-in leg onto the clamp unit.

* * * * *